(12) United States Patent
McKinney et al.

(10) Patent No.: US 10,935,587 B2
(45) Date of Patent: Mar. 2, 2021

(54) APPLICATION AND PRODUCT REALIZATION OF DARPA LADS CAPABILITIES TO LEGACY AVIONICS

(71) Applicant: NORTHROP GRUMMAN SYSTEMS CORPORATION, Falls Church, VA (US)

(72) Inventors: Kenneth F. McKinney, San Diego, CA (US); Kenneth R. Weidele, San Diego, CA (US); Geoffrey R. Janjua, Rolling Hills Estates, CA (US); Allan T. Hilchie, Sierra Vista, AZ (US); Kirk L. Haderlie, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 93 days.

(21) Appl. No.: 16/518,051

(22) Filed: Jul. 22, 2019

(65) Prior Publication Data

US 2021/0025931 A1 Jan. 28, 2021

(51) Int. Cl.
*G01R 31/00* (2006.01)
*G01R 23/16* (2006.01)

(52) U.S. Cl.
CPC .......... *G01R 31/002* (2013.01); *G01R 23/16* (2013.01); *G01R 31/008* (2013.01)

(58) Field of Classification Search
CPC ..... G01R 31/002; G01R 23/16; G01R 31/008
USPC ................ 324/503, 504, 509, 500
See application file for complete search history.

(56) References Cited

U.S. PATENT DOCUMENTS

| | | | |
|---|---|---|---|
| 2002/0093360 A1* | 7/2002 | Nagata .............. | G01R 31/2884 361/86 |
| 2007/0188184 A1* | 8/2007 | Athas ................ | G01R 31/3004 324/750.3 |
| 2012/0086612 A1* | 4/2012 | Linehan ............. | G01R 29/10 343/703 |
| 2012/0223403 A1 | 9/2012 | Keller, III et al. | |
| 2013/0238273 A1* | 9/2013 | Tercariol ........... | H01L 29/7808 702/117 |
| 2014/0145749 A1* | 5/2014 | Lee .................... | G01R 31/2656 324/762.05 |
| 2016/0098561 A1 | 4/2016 | Keller et al. | |

(Continued)

*Primary Examiner* — Giovanni Astacio-Oquendo
(74) *Attorney, Agent, or Firm* — John A. Miller; Shumaker, Loop & Kendrick, LLP

(57) ABSTRACT

A system and related method for determining whether an electrical circuit has been compromised. The system includes a circuit probe positioned relative to the electrical circuit that detects electromagnetic circuit emissions therefrom and an analysis device electrically coupled to the circuit probe and receiving electromagnetic emissions detection signals therefrom, where the analysis device identifies constituent frequencies and their magnitudes in the detection signals. The system also includes a comparison processor responsive to the constituent frequencies and magnitudes from the analysis device, where the comparison processor compares the constituent frequencies and magnitudes to previously stored constituent frequencies and magnitudes obtained from an equivalent test circuit to the electrical circuit to determine whether the electrical circuit has been compromised. A background probe can be provided to obtain background emissions that can be subtracted from the circuit emissions.

20 Claims, 8 Drawing Sheets

(56) References Cited

U.S. PATENT DOCUMENTS

2019/0093829 A1\* 3/2019 Andrew ................ G08B 23/00
2019/0197237 A1 6/2019 Aguayo Gonzalez et al.

\* cited by examiner

APPLICATION AND PRODUCT REALIZATION OF DARPA LADS CAPABILITIES TO LEGACY AVIONICS

BACKGROUND

Field

This disclosure relates generally to a system and method for determining whether an electrical circuit has been compromised and, more particularly, to a system and method for determining whether an electrical circuit has been compromised, where the method includes obtaining baseband electromagnetic emissions from an equivalent test circuit that is operating properly and comparing those emissions to electromagnetic emissions emitted by the circuit when it is operational in the field.

Discussion

Modern aircraft, both manned and unmanned, typically employ a vehicle management system that includes the necessary controllers and other hardware for flight operation of the aircraft. The various sub-systems in the vehicle management system often include safety critical systems that if they were to fail, could cause a catastrophic failure of the aircraft. Therefore, these systems must be designed to have a high degree of reliability against failure. However, because of the vast number of calculations and processes that occur in the vehicle management system, a component generally having a high degree of reliability may still lack redundancy. Further, these type of circuits, devices and systems are sometimes victims of malware, tampering and cyber-attacks. Therefore, safety critical systems on an aircraft typically require some type of fault tolerant system.

For many of the computing systems on an aircraft, fault tolerance is often satisfied by providing redundant hardware, where multiple systems need to report the same output to verify system reliability in a dual-lockstep manner. However, for the digital processing often employed in the safety critical systems on aircraft and otherwise, such redundant applications were previously not possible at the processor level. Further, these types of dual systems have a number of drawbacks, such as twice the power, size, weight, cost, etc.

SUMMARY

The present disclosure describes a system and related method for determining whether an electrical circuit has been compromised. The system includes a circuit probe positioned relative to the electrical circuit that detects electromagnetic circuit emissions therefrom and an analysis device electrically coupled to the circuit probe and receiving electromagnetic emissions detection signals therefrom, where the analysis device identifies constituent frequencies and their magnitudes in the detection signals. The system also includes a comparison processor responsive to the constituent frequencies and magnitudes from the analysis device, where the comparison processor compares the constituent frequencies and magnitudes to previously stored constituent frequencies and magnitudes obtained from an equivalent test circuit to the electrical circuit to determine whether the electrical circuit has been compromised. A background probe can be provided to obtain background emissions that can be subtracted from the circuit emissions.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a system and method for determining whether an electrical circuit has been compromised, where the method includes obtaining baseband electromagnetic emissions from the circuit and comparing those emissions to electromagnetic emissions emitted by the circuit when it is operational in the field is merely exemplary in nature, and is in no way intended to limit the disclosure or its applications or uses. For example, the discussion herein refers to the system and method being employed on flight critical systems on an aircraft. However, as will be appreciated by those skilled in the art, the system and method may have other applications.

The present disclosure proposes a system and method for detecting cyber or malware events using close-in RF measurements of electromagnetic emissions from processing systems with high reliability. The method includes the detection of changes in software being executed relative to a baseline, and the detection of anomalous events during execution of known software. During boot-up of a system, there is a distinct sequence of events that can be observed from RF measurements of the system and can be illustrated on a spectrogram showing unique features. For example, for each clock pulse that causes various operations to be performed in the digital circuit, a unique RF emission will occur as a result of current flow through the circuit for that operation that generates a certain electromagnetic field that is radiated. Further, unique power emissions occur from the processor clock and modulated signal. Machine learning techniques can be employed to identify unique events for the system, which can be modeled. The models can be used as a baseline to compare with emissions from a system being used in the field to differentiate a normal boot-up sequence from an abnormal and possibly malicious activated boot-up sequence. The system and method have particular application for working in conjunction with the known processes for leveraging the analog domain for security (LADS).

Figure 1:
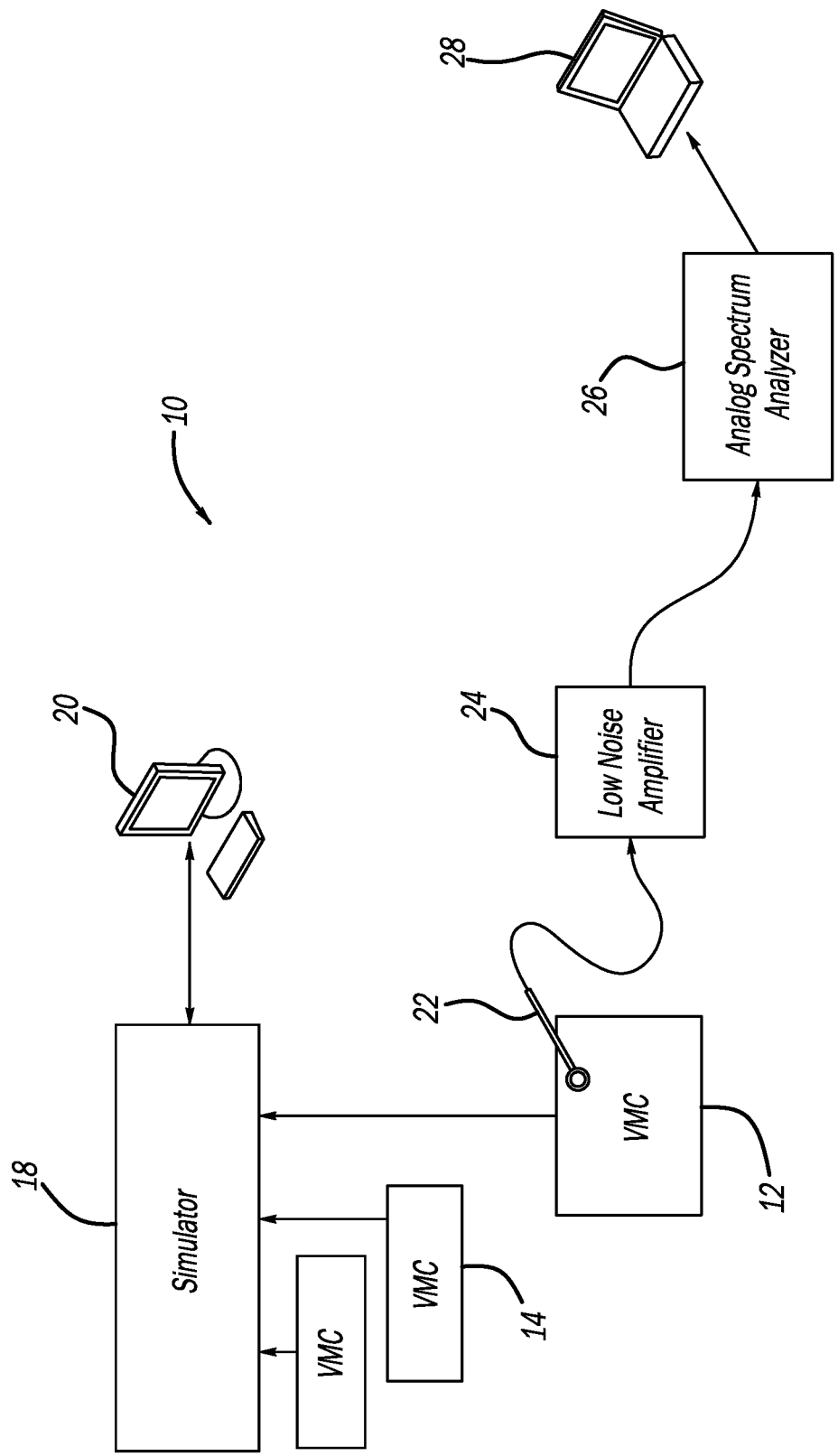
FIG. 1 is a schematic block diagram of a testing detection system illustrating a process for determining baseline electromagnetic emissions from an electrical test circuit, processing the electronic emissions and storing the baseline emissions.

FIG. 1 is a schematic block diagram of a test system 10 for obtaining and storing normal operation electromagnetic RF emissions from a test component box 12 that may include a vehicle management computer (VMC), for example, an aircraft or avionics computer board, that may be one of several component boxes 14, where the component box 12 may include several removable microprocessor boards (not shown), each having one or more circuit modules. The box 12 is not in the field, but is part of a testing configuration where the box 12 is operated by a simulator 18 and is controlled by an operator through a computer 20. The box 12 is intended to represent any component box having circuits that may be subjected to a malicious attack by a virus or firmware, such as aircraft circuits, and that gives off electromagnetic radiation when it is operating at any frequency that can be detected. A near-field RF probe 22 is placed using any suitable technique on or adjacent to a particular microprocessor board in the box 12 so that it is able to detect electromagnetic radiation emitted from the circuits on the board when it is in operation, where the probe 22 would have to be moved, or a separate probe would have to be provided to detect the emissions from other microprocessor boards. The probe 22 can be any probe having any type of antenna, such as a loop antenna, a patch antenna, etc., that detects electromagnetic emissions at any desirably frequency suitable for the purposes discussed herein. The measured electromagnetic RF emissions by the probe 22 are amplified by a low noise amplifier 24 and then sent to an analog spectrum analyzer 26, which may operate, for example, over a frequency band of 9 kHz-26 GHz.

Figure 2:
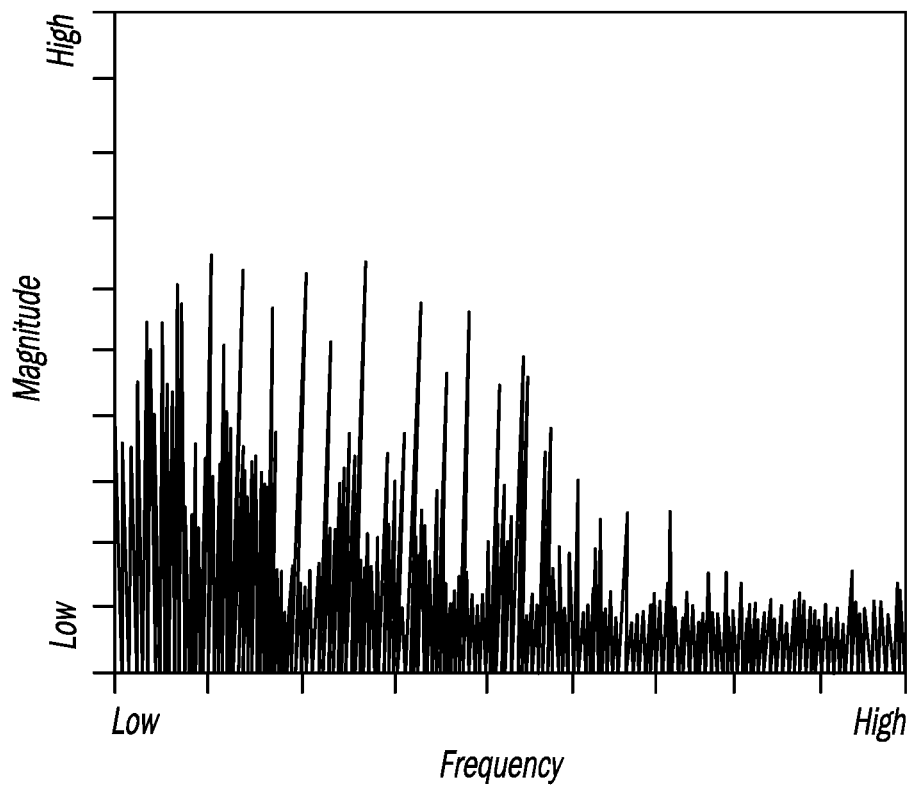
FIG. 2 is a graph with frequency on the horizontal axis and magnitude on the vertical axis showing an example of detected emissions from the test electrical circuit at one given instant in time.

The analyzer 26 identifies the constituent frequencies and their magnitudes of the measured electromagnetic emissions that changes over time as the microprocessor board operates. FIG. 2 is a graph with frequency on the horizontal axis and magnitude on the vertical axis showing an example of the identified frequencies in the detected emissions provided by the analyzer 26 for the particular microprocessor board in the box 12 at a particular point in time. The constituent frequencies and their magnitudes can then be further processed by the spectrum analyzer 26 to give a representation of the emissions for a certain operation, such as a boot-up sequence, and provided to a back-end computer 28.

Figure 3:
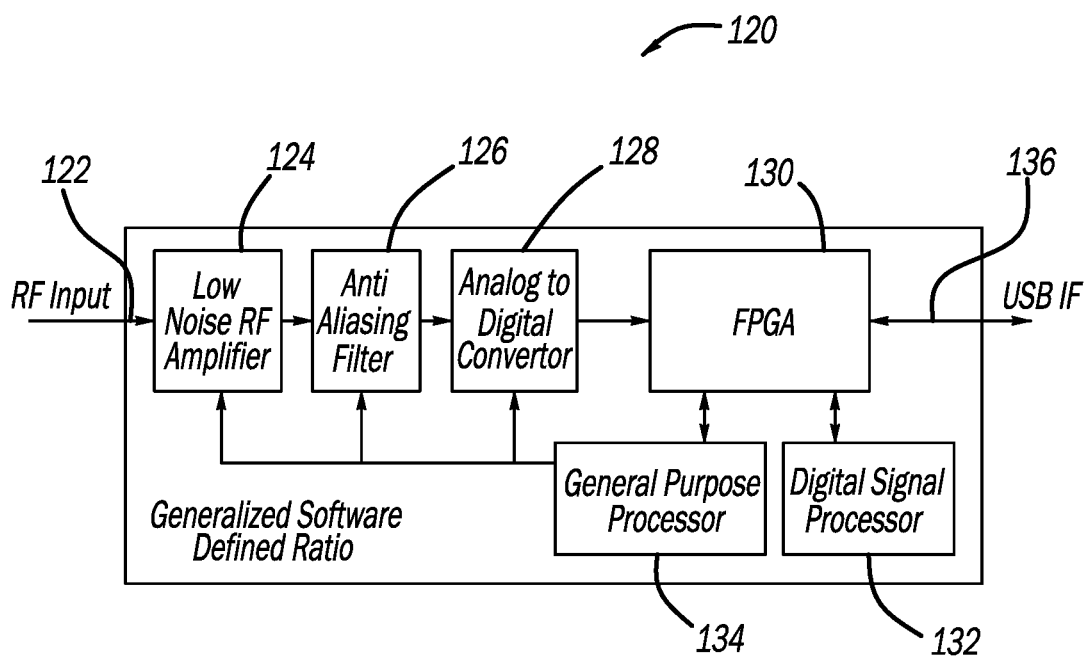
FIG. 3 is a schematic block diagram of a generalized software defined radio used to capture electromagnetic emissions from a test electrical circuit.

FIG. 3 is a block diagram of a software defined radio (SDR) 120 that is an alternative to the analog spectrum analyzer 26 in that it includes digitally programmable elements that can perform the same functions as the analog spectrum analyzer 26 as well as perform a myriad of digital processing functions. An RF signal 122 enters the SDR 120 and is amplified by a low noise RF amplifier 124, which performs the same function as that of the amplifier 24. The amplified input signal is then sent to a high order low pass "brick wall" filter 126, also known as an anti-alias filter. The filter 126 allows signals up to the sample rate of a following analog-to-digital convertor (A/D) 128, but then greatly attenuates (hence "brick wall") signals higher than the sample rate of the A/D 128. Such filtering is required and fundamental to any analog-to-digital conversion to remove false frequency components due to the phenomenon of aliasing. The digital samples from A/D 128 are then processed by a field programmable gate array (FPGA) 130, a digital signal processor (DSP) 132 and a general purpose processor (GPP) 134, which form the core of the SDR processing. The processed digital signal can be presented to a back end computer interface port, such as that of a universal serial bus (USB) 136. A typical data stream from the SDR 120 to the back end computer is that of I and Q samples (in-phase) and (quadrature phase). The particular FPGA bit stream configuration, the DSP code and the GPP code, which enable specific SDR functions, such as two dimensional spectrum analysis, and three dimensional waterfall spectrum analysis can be downloaded to the SDR 120 from the back end computer 28. The following discussion refers the SDR 120 being employed to characterize the emissions instead of the spectrum analyzer 26.

Figure 4:
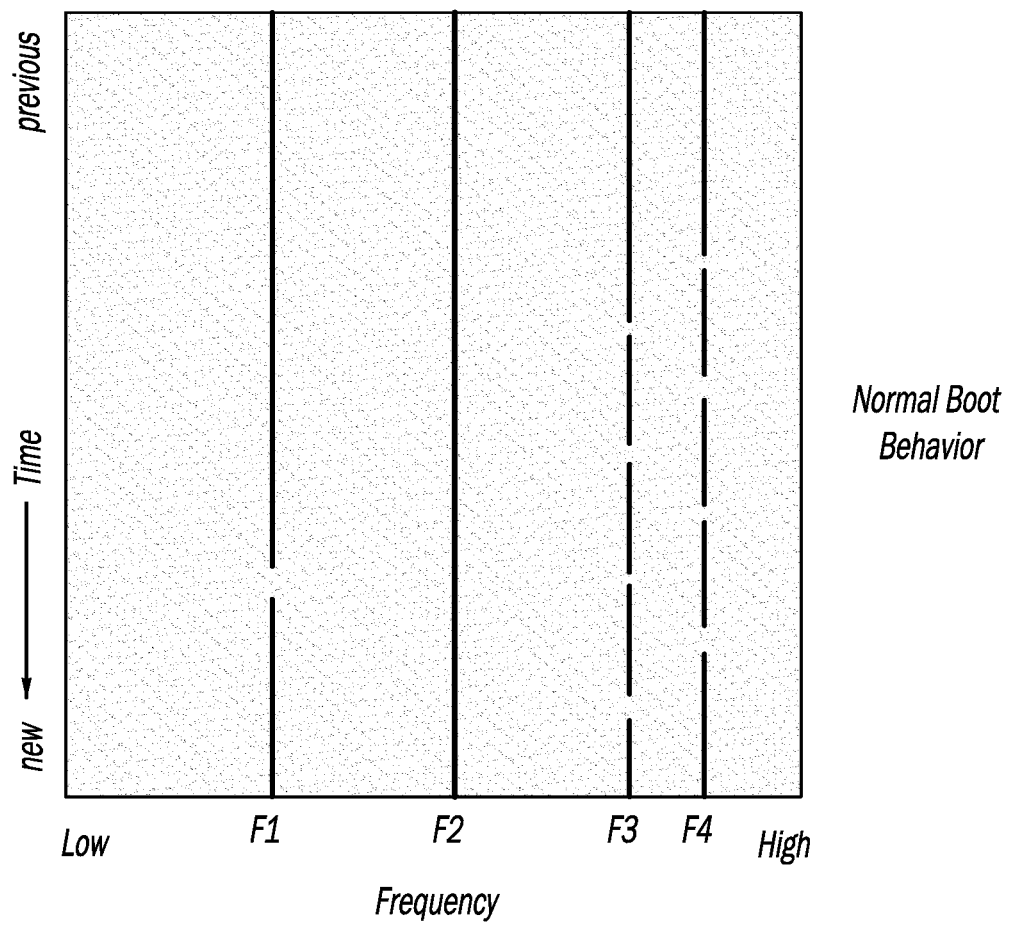
FIG. 4 is a spectrogram with frequency on the horizontal axis and a moving time window on the vertical axis showing intensity representations of the detected emissions from the electrical test circuit in inverse gray scale with dark for highest intensity and light for lowest intensity, where frequencies F1-F4 are signals radiated from a single board computer (SBC) being monitored and are typical of a properly functioning circuit during a given functional mode such as normal boot behavior.

FIG. 4 is a spectrogram with frequency on the horizontal axis and time on the vertical axis of a certain microprocessor boot-up sequence, where the intensity of the detected emissions is represented by reverse grey scale shading. The center line in the spectrogram is caused by emissions from the microprocessor clock signal and the other shorter lines are other emissions caused by various circuits during the normal boot-up sequence of the box 12.

Figure 5:
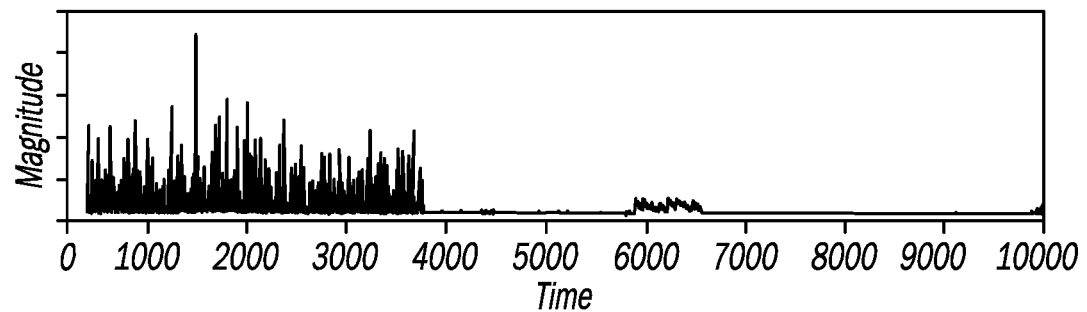
FIG. 5 is a graph with time on the horizontal axis and magnitude on the vertical axis showing the magnitude of clock power electromagnetic emissions from the test electrical circuit.
Figure 6:
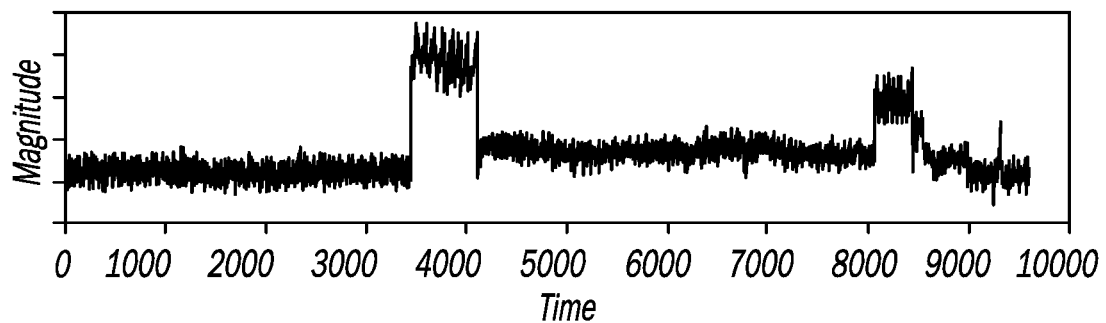
FIG. 6 is a graph with time on the horizontal axis and magnitude on the vertical axis showing the magnitude of modulated power electromagnetic emissions from the electrical test circuit.

The spectrogram can be further analyzed by the SDR 120 to show the power of the emissions overtime during the boot-up sequence. For example, FIGS. 5 and 6 are graphs with time on the horizontal axis and magnitude on the vertical axis, where FIG. 5 shows the clock power and FIG. 6 shows the modulated power. The various emissions representations provided by the SDR 120 can then be sent to the computer 28 that performs machine learning and feature extraction to identify unique features of the emissions that are stored to later be used in the field for a similar microprocessor board consistent with the discussion herein.

Figure 7:
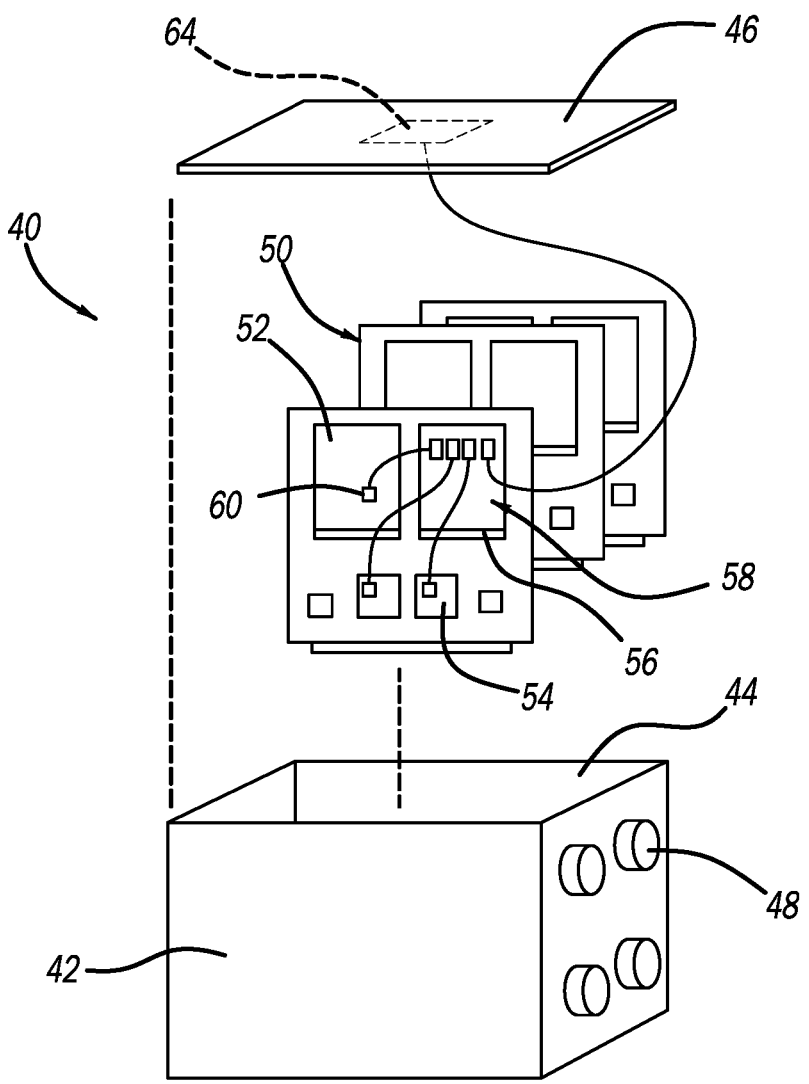
FIG. 7 is an exploded isometric view of a component chassis including microprocessor boards having microprocessors and a detection system for detecting electromagnetic emissions from the boards, microprocessors and chassis enclosure.

FIG. 7 is an exploded isometric view of a component chassis 40, such as an avionics chassis, having an outer box 42 defining an enclosure 44 and having a lid 46, where a number of electrical connectors 48 provide an electrical connection to the box 42 and the electrical circuits therein. The enclosure 44 is able to accept a number of microprocessor boards 50, such as single board computers (SBC), that are slid into slots in the box 42 so that the boards 50 make the desired electrical connection. Each of the boards 50 includes a number of daughter cards 52 each having a number of circuits for performing a certain operation and a number of microprocessors 54. One of the boards 50 has an empty slot 56 in which is provided a multi-channel RF processor software defined radio 58 that is specially configured to process emissions measurements from the cards 52 and the microprocessors 54 to obtain the various spectrograms and frequency plots discussed above identifying features in the RF emissions. A separate antenna probe 60, such as a near-field loop antenna, is attached to some of the cards 52 and some of the microprocessors 54, where the probes 60 detect electromagnetic emissions that are processed by the radio 58. Additionally, an antenna probe 64 is attached to an underside of the lid 44 so that it is in the enclosure 44 to detect background emissions in the enclosure 44 as a baseband that are also processed by the radio 58. The detected background emissions by the probe 64 can be subtracted from the emissions detected by the other probes 60 that would not be from the emissions from the particular card 52 or the microprocessor 54 to improve the signal-to-noise ratio. Although the radio 58 processes detected emissions from three of the cards 52 and the microprocessors 54 in this embodiment, the radio 58 can process emissions from any reasonable number of circuits in the chassis 40.

Figure 8:
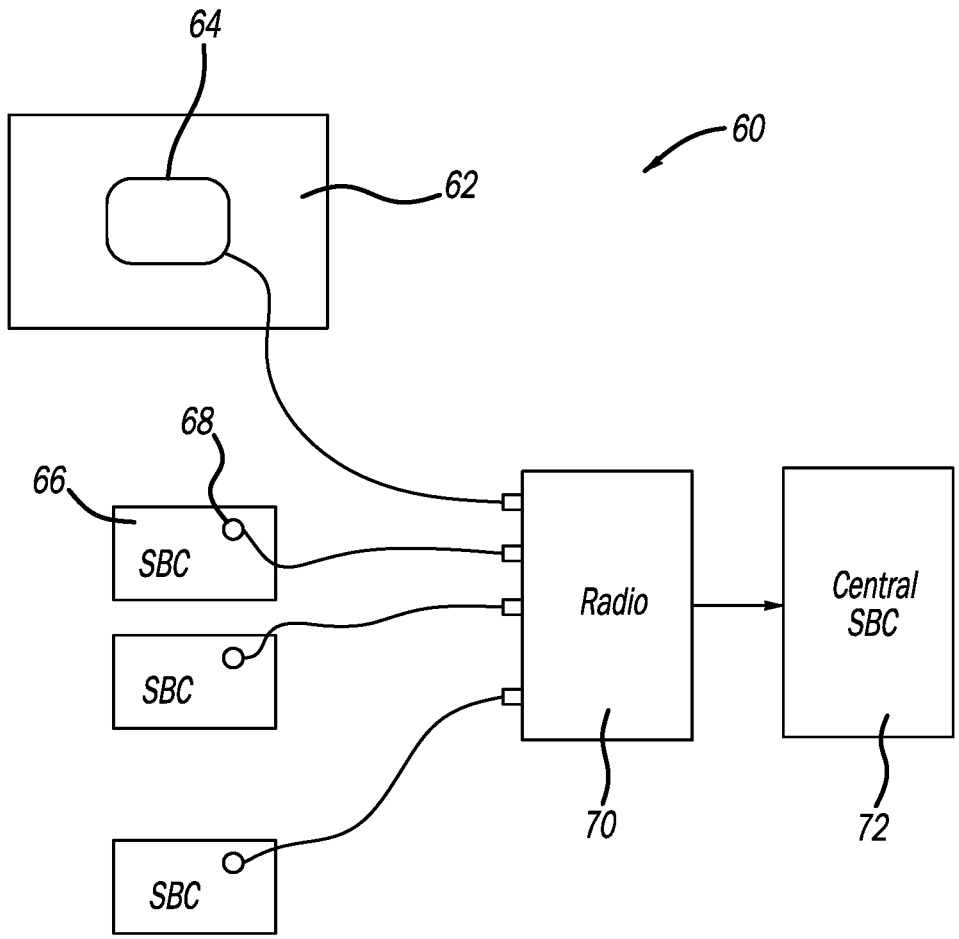
FIG. 8 is a schematic block diagram of a detection system for detecting electromagnetic emissions from a plurality of computer boards.

FIG. 8 is a schematic block diagram of a detection system 60 of the type just described, but separated from the chassis 40. The system 60 includes a chassis lid 62 having an antenna 64 coupled thereto, three SBCs 66 each having a probe 68 coupled thereto and a multi-channel RF processor software defined radio 70 that receives the detected electromagnetic emissions from the probes 68 and the antenna 64. The radio 70 processes the detected signals and converts them to the frequency domain, and provides the signals to a central SBC health monitor processor 72 that compares the signals in real time to signals stored from the test of equivalent circuits and microprocessors that were operating properly having the proper operating emissions. The processor 72 may be provided in the slot 56 or may be provided in an empty back-plane slot of the boards 50 in the chassis 40.

Figure 9:
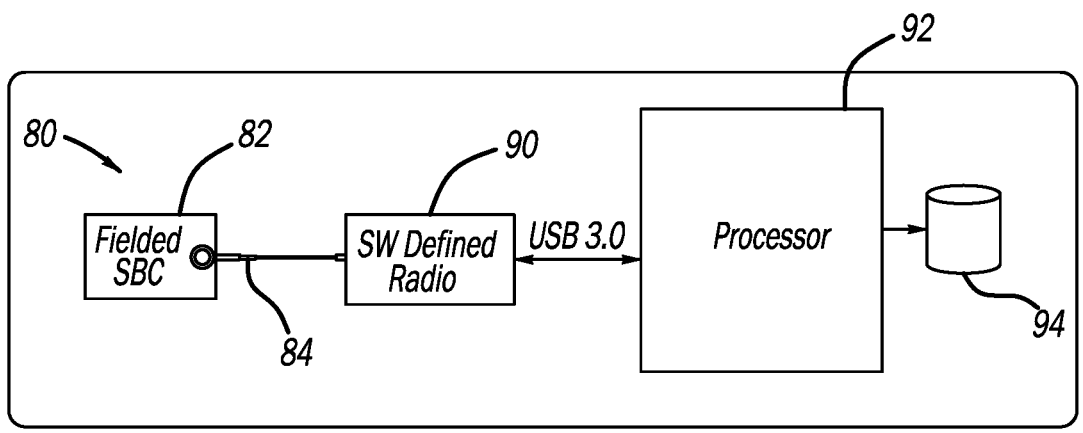
FIG. 9 is a schematic block diagram of a testing detection system illustrating a process for determining baseline electromagnetic emissions from an electrical test circuit and storing the baseline emissions.

FIG. 9 is a schematic block diagram of a testing detection system 80 illustrating a process for determining baseline electromagnetic emissions from a properly operating test electrical circuit, such as an SBC 82, and storing the baseline emissions for later use. The system 80 includes an electromagnetic (EM) probe 84 that captures the electromagnetic emissions from the SBC 82 in the manner discussed above that are converted to representative voltages. The voltages are converted to the digital domain by an SDR 90 and the digital signals are analyzed by the SDR 90 configures as a suitable spectrum analyzer to obtain characteristic voltage/time and frequency/time ratios in the emissions. The characteristic voltage/time and frequency/time ratio signals are provided to a feature extraction processor 92 that provides post processing, such as feature extraction, machine learning, tolerance additions, and other such parametric analysis of the signals to identify unique characteristics and create reference data files of the emissions, referred to herein as golden data characterization signature files (Asigs), that are stored in a storage device 94 for later use in the field.

Figure 10:
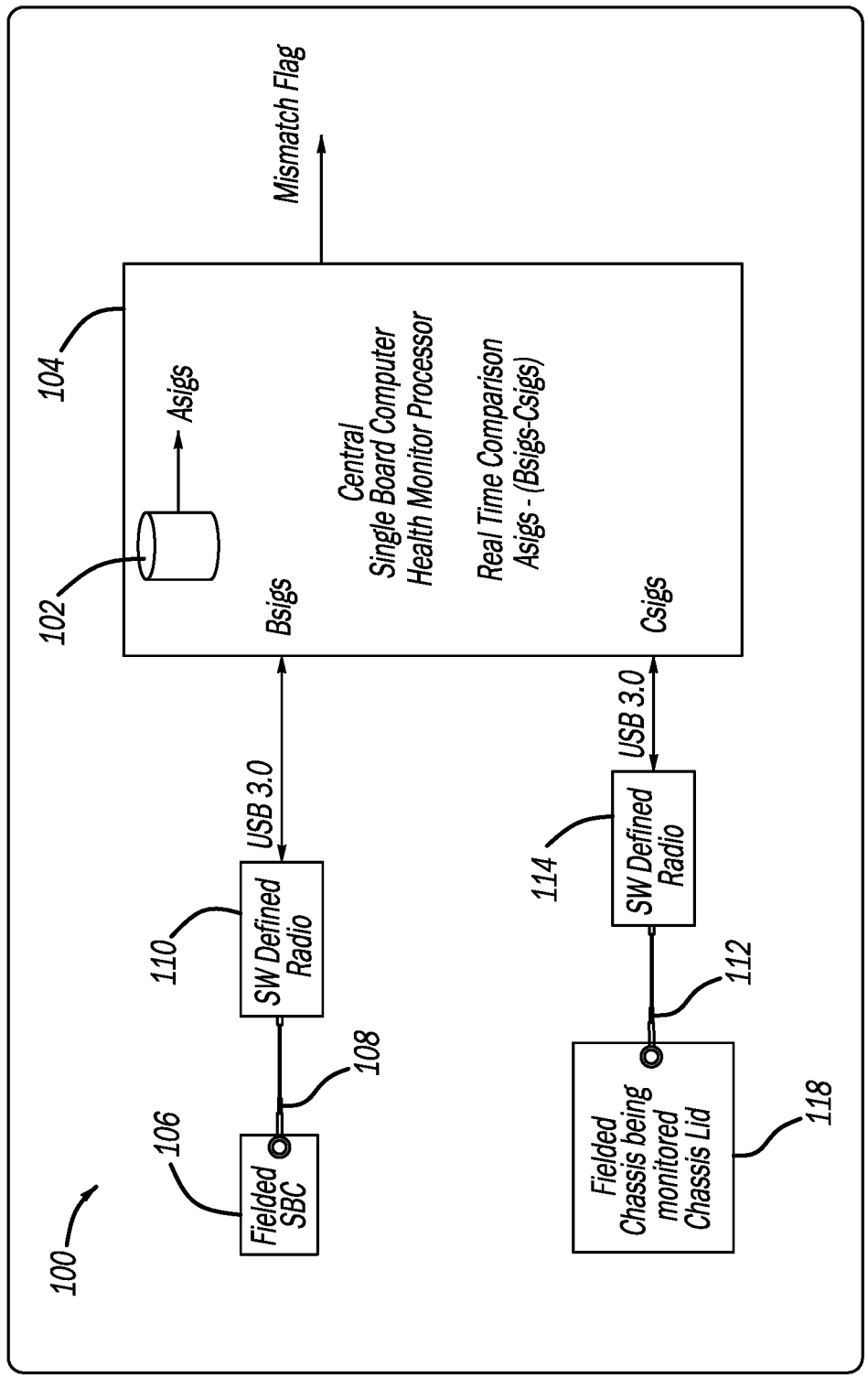
FIG. 10 is a schematic block diagram of a detection system illustrating a process for comparing the stored baseline electromagnetic emissions to electromagnetic emissions detected in the field from an equivalent circuit is operational.

FIG. 10 is a schematic block diagram of a field detection system 100 illustrating a process for comparing the stored Asigs processed from electromagnetic emissions from the test SBC 82 to processed electromagnetic emissions from an equivalent SBC 106 in real-time as the SBC 106 is operational in the field to identify whether the SBC 106 has been compromised, either maliciously or otherwise. The Asigs previously stored in the storage device 94 are transferred to a storage device 102 that is provided in the field as part of the system 100, where the Asigs are available to a comparison processor 104, similar to the processor 72. The system 100 includes a probe 108 that measures the electromagnetic emissions from the SBC 106 in the manner discussed above that are converted to representative voltages. The voltages are converted to the digital domain by an SDR 110 and the digital signals are analyzed by the SDR 110 configured as a suitable spectrum analyzer to obtain characteristic voltage/time and frequency/time ratios in the emissions. The characteristic voltage/time and frequency/time ratio signals referred to herein as monitored board real time data characterization signatures (Bsigs), are provided to the processor 104.

The system 100 includes an EM probe 120 that captures the electromagnetic emissions from a chassis lid 118 that houses the SBC 106 in the manner discussed above that are converted to representative voltages. The voltages are converted to the digital domain by an SDR 114 and the digital signals are analyzed by the SDR 114 configured as a suitable spectrum analyzer to obtain characteristic voltage/time and frequency/time ratios in the emissions. The characteristic voltage/time and frequency/time ratio signals, referred to herein as chassis background real time data characterization signatures (Csigs), are provided to the processor 104 that subtracts the subtracted real time emission files from the Asigs reference files (Asigs−(Bsigs−Csigs)) to obtain a mismatch value outputted from the processor 104. If the mismatch value exceeds some threshold, then the SBC 106 is determined to be compromised and further steps are performed to address that problem.

Figure 11:
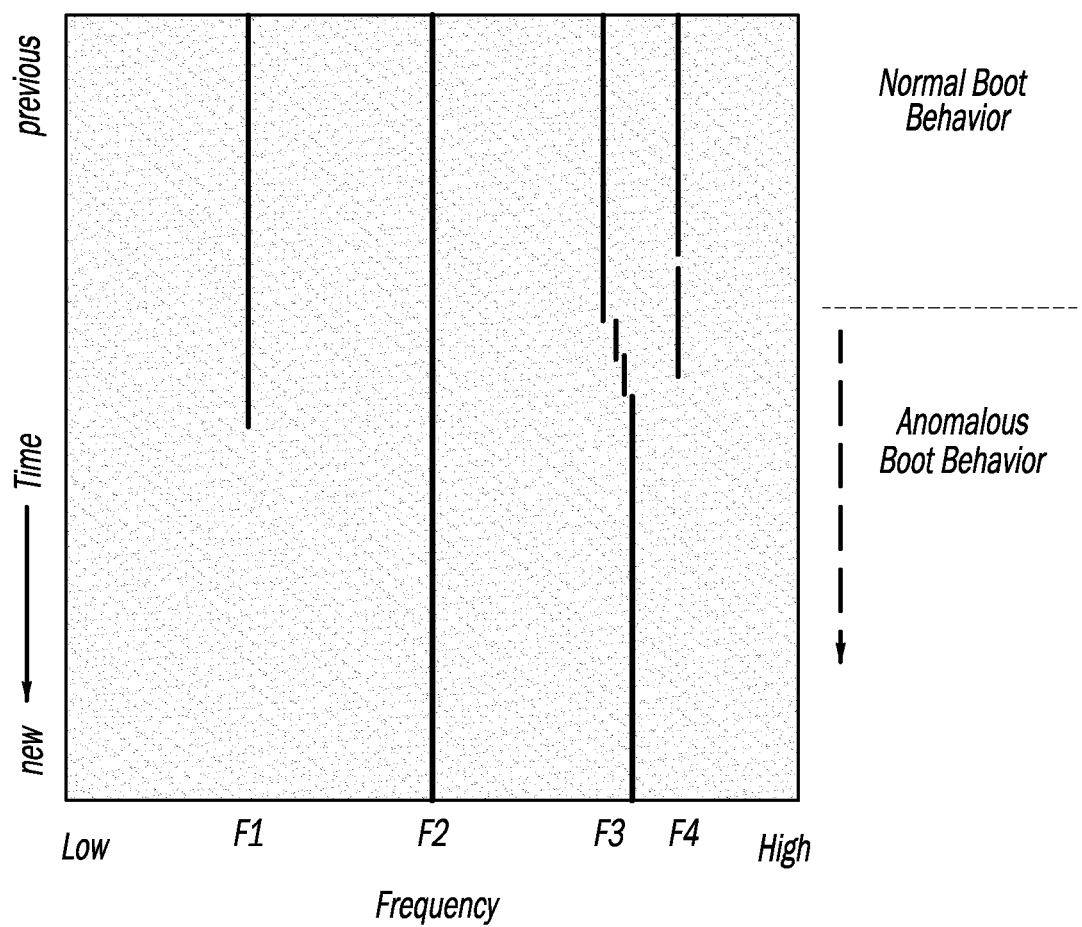
FIG. 11 is the spectrogram as shown in FIG. 4 with anomalies of circuit behavior found in the frequencies F1, F3 and F4 from the SBC being monitored and are atypical of a properly functioning circuit during the same functional mode.

FIG. 11 is the spectrogram shown in FIG. 4 of a certain microprocessor boot-up sequence, and showing notional anomalies of a circuit plagued with malware or other nefarious agents. Such anomalies are detected and reported by the circuitry and processes described in these collective paragraphs.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A detection system for determining whether at least one electrical circuit has been compromised, said system comprising:
at least one circuit probe positioned relative to the at least one electrical circuit and detecting electromagnetic emissions therefrom;
a first analysis device electrically coupled to the at least one circuit probe and receiving electromagnetic emissions detection signals therefrom, said first analysis device identifying constituent frequencies and their magnitudes in the detection signals; and
a comparison processor responsive to the constituent frequencies and magnitudes from the first analysis device, said comparison processor comparing the constituent frequencies and magnitudes to previously stored constituent frequencies and magnitudes obtained from an equivalent circuit to the at least one electrical circuit to determine whether the at least one electrical circuit has been compromised.

2. The system according to claim 1 wherein the first analysis device includes a spectrum analysis device that provides voltage/time data and frequency/time data in the detection signals that are converted to the constituent frequencies and magnitudes.

3. The system according to claim 2 wherein the first analysis device includes a data characterization processor that provides data characterization and signature feature extraction of the voltage/time data and frequency/time data.

4. The system according to claim 2 further comprising a software defined radio that converts the detections signals from the analog domain to the digital domain before being sent to the first analysis device.

5. The system according to claim 1 further comprising a background probe positioned to detect background electromagnetic emissions therefrom and a second analysis device electrically coupled to the background probe and receiving electromagnetic emissions detection signals therefrom, said second analysis device identifying constituent frequencies and their magnitudes in the detection signals from the background probe, said comparator subtracting the constituent frequencies and their magnitudes in the detection signals from the background probe from the constituent frequencies and their magnitudes in the detection signals from the circuit probe before comparing the constituent frequencies and magnitudes to the previously stored constituent frequencies and magnitudes.

6. The system according to claim 1 wherein the at least one electrical circuit is a plurality of electrical circuits, the at least one circuit probe is a plurality of circuit probes for the plurality of circuits and the first analysis device is a multi-channel analysis device electrically coupled to all of the probes, said comparison processor determining whether any of the plurality of circuits has been compromised.

7. The system according to claim 6 wherein the plurality of circuits are provided within a single chassis.

8. The system according to claim 7 wherein the plurality of circuits are provided on electronic cards and wherein the first analysis device is provided within a slot in one of the cards.

9. The system according to claim 7 wherein the chassis is an avionics chassis.

10. The system according to claim 1 wherein the first analysis device is a multi-channel RF processor software defined radio.

11. The system according to claim 1 wherein the first analysis device monitors the detection signals during a boot-up sequence of the at least electrical circuit.

12. A detection system for determining whether a computer has been compromised, said system comprising:
a circuit probe positioned relative to the computer and detecting electromagnetic computer emissions therefrom;
a first software defined radio for converting computer emissions signals from the circuit probe from the analog domain to the digital domain;
a first spectrum analysis device for identifying computer voltage/time and frequency/time constituents in the digital computer emissions signals;
a first real time data characterization processor for providing data characterization and feature extraction of the computer voltage/time and frequency/time constituents and providing computer data characterization signature files;
a background probe positioned to detect electromagnetic background emissions;
a second software defined radio for converting background emissions signals from the background probe from the analog domain to the digital domain;
a second spectrum analysis device for identifying background voltage/time and frequency/time constituents in the digital background emissions signals;
a second real time data characterization processor for providing data characterization and feature extraction of the background voltage/time and frequency/time constituents and providing background data characterization signature files; and
a comparison processor responsive to the computer data characterization signature files and the background data characterization signature files, said comparison processor subtracting the background data characterization signature files from the computer data characterization signature files and comparing the subtracted computer data characterization signature files to previously stored test data characterization signature files obtained from an equivalent computer to determine whether the computer has been compromised.

13. The system according to claim 12 wherein the computer is provided within a component chassis.

14. The system according to claim 13 wherein the background probe is secured to an underside of a lid of the chassis.

15. The system according to claim 13 wherein the chassis is an avionics chassis.

16. A method for determining whether at least one electrical circuit has been compromised, said method comprising:
detecting electromagnetic emissions by at least one circuit probe positioned relative to the at least one electrical circuit;
identifying constituent frequencies and their magnitudes in the detected electromagnetic emissions by an analysis device; and
comparing the constituent frequencies and magnitudes to previously stored constituent frequencies and magnitudes obtained from an equivalent circuit to the at least one electrical circuit in a processor to determine whether the at least one electrical circuit has been compromised.

17. The method according to claim 16 wherein identifying constituent frequencies and their magnitudes includes providing voltage/time data and frequency/time data in the detected electromagnetic emissions that are converted to the constituent frequencies and magnitudes.

18. The method according to claim 17 wherein identifying constituent frequencies and their magnitudes includes providing data characterization and signature feature extraction of the voltage/time data and frequency/time data.

19. The method according to claim 16 further comprising detecting background electromagnetic emissions and identifying constituent frequencies and their magnitudes in the background electromagnetic emissions, wherein comparing the constituent frequencies and magnitudes includes subtracting the constituent frequencies and their magnitudes in the background electromagnetic emissions from the constituent frequencies and their magnitudes in the detected electromagnetic emissions before comparing the constituent frequencies and magnitudes to the previously stored constituent frequencies and magnitudes.

20. The method according to claim 16 wherein the at least one circuit probe detects the electromagnetic emissions during a boot-up sequence of the at least electrical circuit.

* * * * *